United States Patent
Taniguchi

(10) Patent No.: US 8,013,553 B2
(45) Date of Patent: Sep. 6, 2011

(54) ROTARY ELECTRIC SYSTEM WITH NEUTRAL-POINT POWERING SYSTEM

(75) Inventor: Makoto Taniguchi, Oobu (JP)

(73) Assignee: Denso Corporation, Kariya (JP)

( * ) Notice: Subject to any disclaimer, the term of this patent is extended or adjusted under 35 U.S.C. 154(b) by 430 days.

(21) Appl. No.: 12/247,415

(22) Filed: Oct. 8, 2008

(65) Prior Publication Data

US 2009/0128076 A1    May 21, 2009

(30) Foreign Application Priority Data

Oct. 10, 2007    (JP) .................................. 2007-264717

(51) Int. Cl.
*H02P 25/00*    (2006.01)

(52) U.S. Cl. ................ 318/400.41; 318/400.27; 318/442

(58) Field of Classification Search ............. 318/400.41, 318/400.27, 440, 442, 105, 771; 317/727
See application file for complete search history.

(56) References Cited

U.S. PATENT DOCUMENTS

| | | | |
|---|---|---|---|
| 6,137,704 A | 10/2000 | Ito et al. | |
| 6,320,775 B1 | 11/2001 | Ito et al. | |
| 6,518,736 B2* | 2/2003 | Sasaki et al. | 322/16 |
| 6,548,984 B2* | 4/2003 | Shamoto et al. | 318/801 |
| 6,630,804 B2* | 10/2003 | Moriya et al. | 318/85 |
| 7,259,530 B2* | 8/2007 | Ochiai et al. | 318/105 |
| 7,276,864 B2* | 10/2007 | Haruna et al. | 315/308 |
| 2002/0105300 A1* | 8/2002 | Moriya et al. | 318/727 |
| 2003/0057908 A1* | 3/2003 | Kusaka et al. | 318/442 |
| 2003/0057914 A1* | 3/2003 | Kamatsu et al. | 318/727 |
| 2004/0150365 A1* | 8/2004 | Ochiai | 318/801 |
| 2004/0222754 A1* | 11/2004 | Ochiai et al. | 318/105 |
| 2005/0258796 A1* | 11/2005 | Kusaka | 318/801 |
| 2007/0120520 A1* | 5/2007 | Miyazaki et al. | 318/801 |
| 2008/0278102 A1* | 11/2008 | Taniguchi | 318/400.27 |
| 2009/0033251 A1* | 2/2009 | Perisic et al. | 318/105 |
| 2009/0033274 A1* | 2/2009 | Perisic et al. | 318/771 |

FOREIGN PATENT DOCUMENTS

| | | |
|---|---|---|
| JP | H10-337047 | 12/1998 |
| JP | 2002-218793 | 8/2002 |

* cited by examiner

*Primary Examiner* — Paul Ip
(74) *Attorney, Agent, or Firm* — Nixon & Vanderhye P.C.

(57) ABSTRACT

In a rotary electric system, a controller works to turn high-side and low-side switching elements of first and second multiphase inverters on and off to thereby cause:
the first multiphase inverter to intermittently supply a first phase current to the first star-connected multiphase stator windings per phase to charge first electromagnetic energy in first star-connected multiphase stator windings per phase, the first electromagnetic energy charging a capacitor;
the second multiphase inverter to intermittently supply a second phase current to the second star-connected multiphase stator windings per phase to charge second electromagnetic energy in the second star-connected multiphase stator windings per phase, the second electromagnetic energy charging the capacitor. The first phase current for each phase and the second phase current for a corresponding one phase have a predetermined second phase difference from each other, and the first phase difference is matched with the second phase difference.

8 Claims, 8 Drawing Sheets

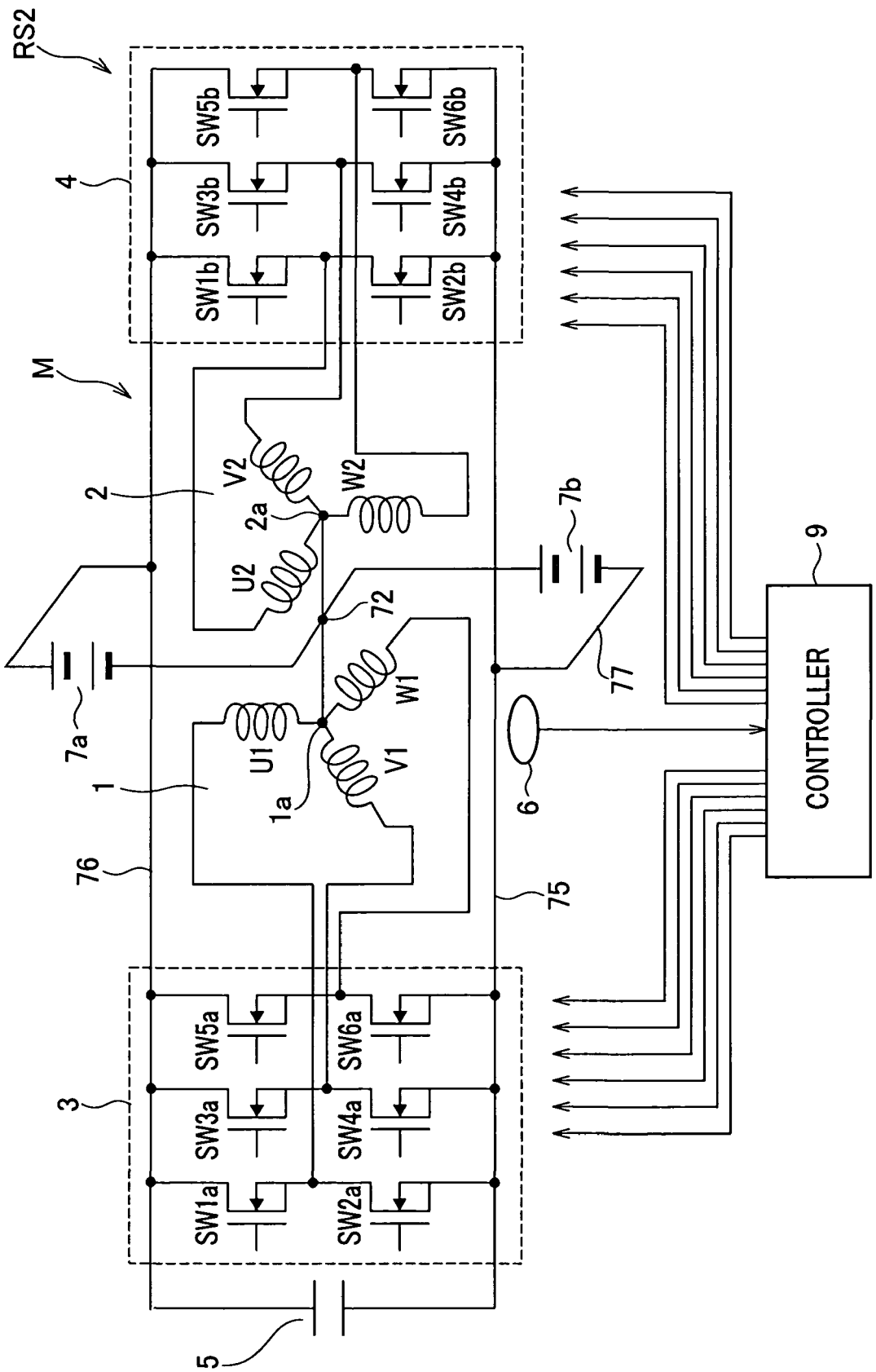

ROTARY ELECTRIC SYSTEM WITH NEUTRAL-POINT POWERING SYSTEM

CROSS REFERENCE TO RELATED APPLICATIONS

This application is based on Japanese Patent Application 2007-264717 filed on Oct. 10, 2007. The descriptions of the Patent Application are all incorporated herein by reference.

FIELD OF THE INVENTION

The present invention relates to rotary electric systems equipped with a star-connected multiphase stator windings. Such rotary electric systems are used widely for: motor vehicles as their electric power steering systems, hybrid vehicles as their drive systems, and electric compressors as their drive systems.

BACKGROUND OF THE INVENTION

A common motor system for motor vehicles is designed to boost a battery voltage by a specific booster, and to apply the boosted voltage to an inverter, thus achieving higher output power with low loss and improving the ability of the motor system to respond to demands higher RPM.

In order to omit the specific booster, U.S. Pat. No. 6,320,775 corresponding to Japanese Patent Application Publication NO. H10-337047 discloses a booster system. The booster system is designed to apply a battery voltage to a neutral point of star-connected multiphase stator windings of a brushless motor to thereby serve each of the multiphase stator windings as a reactor. The configuration of the booster system allows increase in magnetic energy stored in each of the multiphase stator windings, thus boosting a voltage to be applied to an inverter for driving the multiphase stator windings. Such a boosting system disclosed in U.S. Pat. No. 6,320,775 will be referred to as "neutral-point powering booster system" hereinafter.

However, it is known in the art that the neutral-point powering booster system disclosed in U.S. Pat. No. 6,320,775 increases third harmonic wave components in a direct current supplied from a power supply source due to variations in the potential of the neutral point; this third harmonic wave components are superimposed on a fundamental wave component of an armature current (stator current) per phase.

FIG. 5 schematically illustrates waveforms of the fundamental wave component of the U-phase stator current Iu1 and the direct current Idc1 supplied from the power supply source of the neutral-point powering booster system; this direct current Idc1 contains the third harmonic wave components.

Specifically, FIG. 5 clearly shows that the direct current Idc1 periodically varies due to the third harmonic wave components.

In order to reduce the third harmonic wave components in the direct current, Japanese Patent Application Publication No. 2002-218793 discloses a system including a pair of star-connected multiphase stator windings and a pair of multiphase inverters for driving the respective star-connected multiphase windings.

The system is designed such that a positive electrode of a power supply source is connected with a neutral point of one of the pair of multiphase stator windings and a negative electrode of the power supply source is connected with that of the other thereof. Such a system disclosed in Japanese Patent Application Publication No. 2002-218793 will be referred to as "inter neutral-point powering system" hereinafter.

The inter neutral-point powering system is designed to use a difference in potential between the neutral point of one of the pair of multiphase stator windings and that of the other thereof. For this reason, the inter neutral-point powering system may be difficult to achieve commonality in potential between DC terminals of one of the pair of multiphase inverters and those of the other thereof.

This results in that a low-side DC potential of the low-side DC terminal of one of the pair of the multiphase inverters has a negative potential lower than a ground potential. This may make difficult that such an inter neutral-point powering system is applied to in-vehicle electric systems with vehicle body ground (body earth), such as in-vehicle electric systems with batteries for accessories.

SUMMARY OF THE INVENTION

In view of the circumstances set force above, an object of an aspect of the present invention is to provide rotary electric systems each provided with a pair of first and second multiphase stator windings and a pair of first and second multiphase inverters for supplying power to the respective first and second multiphase stator windings, which are capable of reducing the third harmonic wave components with DC input terminals of the first and second multiphase inverters being common in potential with each other.

According to the one aspect of the present invention, a rotary electric system includes a rotary electric machine provided with a rotor, a common stator core, and a pair of first and second star-connected multiphase stator windings each with a neutral point. The first and second star-connected multiphase stator windings are wound in the common stator core with a predetermined first phase difference therebetween. The rotary electric machine works to rotate the rotor when at least one of the first and second star-connected multiphase stator windings is energized. The rotary electric system includes a pair of first and second multiphase inverters each having a high-side terminal and a common low-side terminal. The first multiphase inverter includes a high-side switching element and a low-side switching element per phase of the first multiphase stator windings. The second multiphase inverter includes a high-side switching element and a low-side switching element per phase of the second multiphase stator windings. The rotary electric system includes a capacitor connected between the common high-side terminal and the common low-side terminal of the first and second multiphase inverters, and a direct current power source connected between at least one of the high-side terminal and the low-side terminal of each of the first and second multiphase inverters and the neutral points of the first and second multiphase stator windings. The rotary electric system includes a controller connected with the high-side and low-side switching elements per phase of each of the first and second multiphase stator windings and working to turn the high-side and low-side switching elements on and off to thereby cause:

the first multiphase inverter to intermittently supply a first phase current to the first star-connected multiphase stator windings per phase to charge first electromagnetic energy in the first star-connected multiphase stator windings per phase, the first electromagnetic energy charging the capacitor;

the second multiphase inverter to intermittently supply a second phase current to the second star-connected multiphase stator windings per phase to charge second electromagnetic energy in the second star-connected multiphase stator windings per phase, the second electromagnetic energy charging the capacitor. The first phase current for each phase and the second phase current for a corresponding one phase have a predetermined second phase difference from each other. The first phase difference is matched with the second phase difference.

According to one aspect of the present invention, adjustment of the first phase difference matched with the second phase difference allows flow of higher harmonic wave components between the direct current power source and each of the first and second multiphase inverters.

In addition, in the one aspect of the present invention, the direct current power source is connected between at least one of the high-side terminal and the low-side terminal of each of the first and second multiphase inverters and the neutral points of the first and second multiphase stator windings.

This structure allows the at least one of the high-side terminal and the low-side terminal of the first and second multiphase inverters to be common in potential to each other. This can simplify a circuit structure of the rotary electric system according to the one aspect of the present invention.

BRIEF DESCRIPTION OF THE DRAWINGS

Other objects and aspects of the invention will become apparent from the following description of embodiments with reference to the accompanying drawings in which:

FIG. 8 is a circuit diagram schematically illustrating an example of the structure of a rotary electric system according to a second modification of the embodiment of the present invention.

DETAILED DESCRIPTION OF EMBODIMENTS OF THE INVENTION

An embodiment of the present invention will be described hereinafter with reference to the accompanying drawings.

Figure 1:
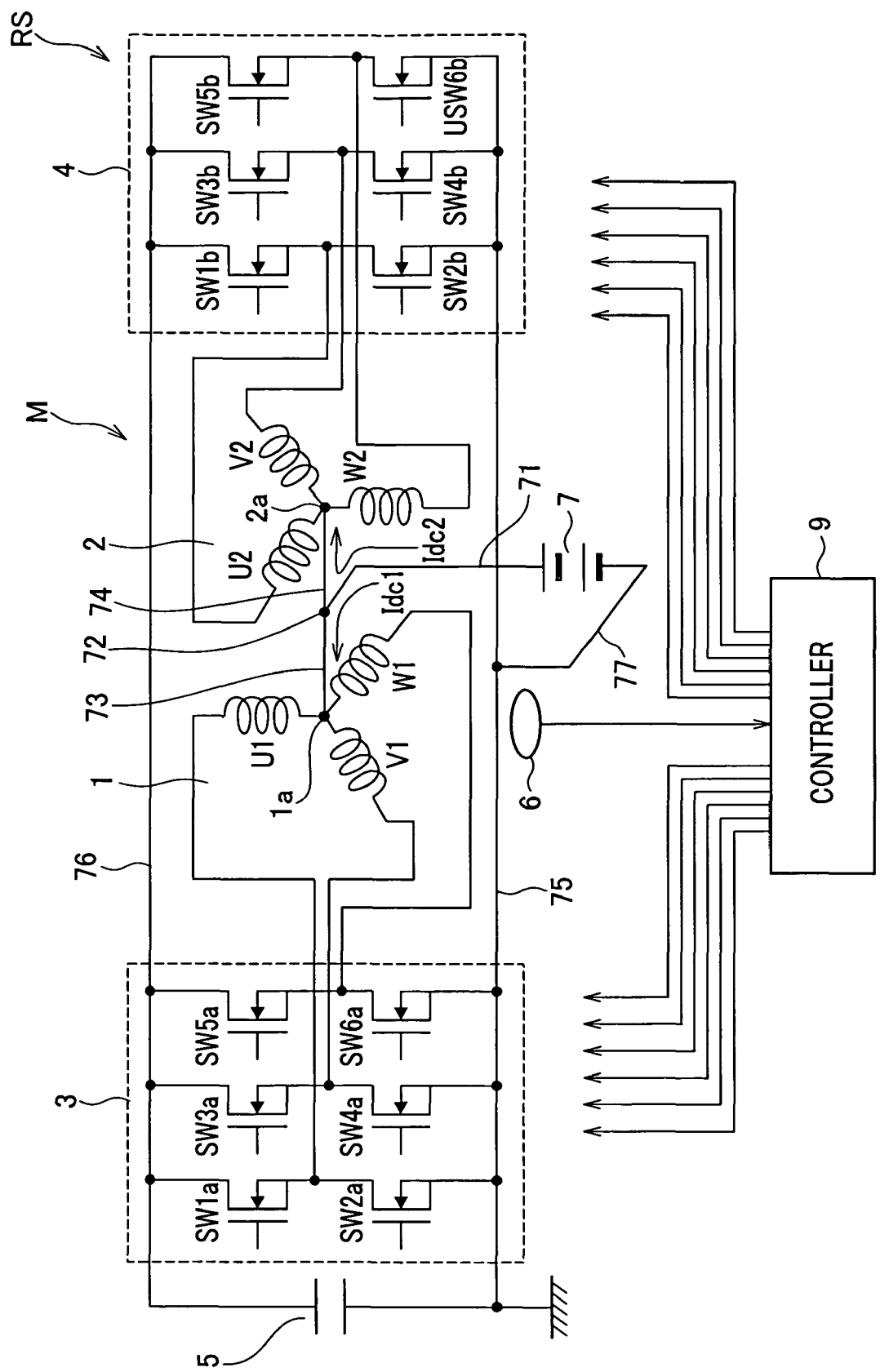
FIG. 1 is a circuit diagram schematically illustrating an example of the structure of a rotary electric system according to an embodiment of the present invention.

Referring to FIG. 1, there is provided a rotary electric system RS according to an embodiment of the present invention.

The rotary electric system RS includes a three-phase motor M.

The three-phase motor M is equipped with an annular rotor (not shown), a common stator core SC (see FIG. 2), and a pair of first and second star-connected three-phase armature coils (stator coils) 1 and 2, which will be referred to simply as "first and second stator coils 1 and 2 hereinafter.

The annular rotor is provided at its circumferential portion with four poles consisting of alternate north poles (N) and south poles (S). The four poles have a pole pitch of an electric angle of 180 degrees.

The common stator core (armature core) SC is disposed around the outer periphery of the rotor such that the inner periphery of the stator core is opposite to the outer periphery of the rotor with a predetermined air gap. The stator core SC is formed at its inner periphery with first to twelfth teeth. The first to twelfth teeth of the stator core SC are equally spaced to define first to twelfth slots therebetween. Reference numerals (slot numbers) of 1 to 12 are assigned to the first to twelfth slots, respectively.

The first stator coil 1 consists of a U-phase stator winding U1, a V-phase stator winding V1, and a W-phase stator winding W1. The three-phase stator windings U1, V1, and W1 are wound in the slots such that the U-, V-, and W-phase stator windings U1, V1, and W1 are shifted by, for example, 120 electric degrees ($2\pi/3$ radian) in phase from each other. One ends of the U-, V-, and W-phase stator windings U1, V1, and W1 are connected to each other in star configuration to constitute a neutral point 1a.

Similarly, the second stator coil 2 consists of a U-phase stator winding U2, a V-phase stator winding V2, and a W-phase stator winding W2. The three-phase stator windings U2, V2, and W2 are wound in the slots such that the U-, V-, and W-phase stator windings U2, V2, and W2 are shifted by, for example, 120 electric degrees ($2\pi/3$ radian) in phase from each other. One ends of the U-, V-, and W-phase stator windings U2, V2, and W2 are connected to each other in star configuration to constitute a neutral point 2a.

The first stator coil 1 and the second stator coil 2 are arranged to be shifted by, for example, 60 electric degrees ($\pi/3$ radian) in phase from each other.

The rotary electric system RS includes a first conductive line 73 and a second conductive line 74. One end of the first conductive line 73 is connected with the neutral point 1a, and one end of the second conductor line 74 is connected with the neutral point 2a. The other end of the first conductive line 73 and that of the second conductive line 74 are connected with each other at a connecting point 72.

The rotary electric system RS also includes a pair of first and second three-phase inverters 3 and 4 for supplying three-phase AC power to the first and second stator coils 1 and 2, respectively. The rotary electric system RS further includes a capacitor 5, a pole position sensor 6, a battery 7 as an example of DC power supply sources, a controller 9, and current sensors 81 (see FIG. 4).

The first three-phase inverter, referred to simply as "first inverter", 3 is composed of a first pair (bridge arm) of series-connected switching elements SW1a and SW2a, a second pair of series-connected switching elements SW3a and SW4a, and a third pair of series-connected switching elements SW5a and SW6a. The first inverter 3 is also composed of flywheel diodes (not shown) connected in antiparallel with the switching elements SW1a, SW2a, SW3a, SW4a, SW5a, and SW6a, respectively.

The cathode of each of the flywheel diodes is connected with the drain of a corresponding one of the switching elements, and the anode thereof is connected with the source of a corresponding one of the switching elements.

The first to third bridge arms of switching elements SW1a to SW6a are parallely connected with each other in bridge configuration.

A connecting point through which the switching elements SW1a and SW2a of the first pair are connected with each other in series is connected with an output lead extending from the output end (other end) of the U-phase stator winding U1. Similarly, a connecting point through which the switching elements SW3a and SW4a of the second pair are connected with each other in series is connected with an output lead extending from the output end (other end) of the V-phase stator winding V1. Moreover, a connecting point through which the switching elements SW5a and SW6a of the third pair are connected with each other in series is connected with an output lead extending from the output end (other end) of the W-phase stator winding W1.

One end of each of the first, second, and third bridge arms is connected with a common high-side DC terminal 76 of the first and second inverters 3 and 4, and the common high-side DC terminal 76 is connected with one electrode of the capacitor 5. The other end of each of the first, second, and third bridge arms is connected with a common low-side DC terminal 75 of the first and second inverters 3 and 4, and the common low-side DC terminal 75 is connected with the other electrode of the capacitor 5.

Reference character "Idc1" represents a current to be supplied from the battery 7 to the first inverter 3 and the first stator coil 1, and reference character "Idc2" represents a current to be supplied from the battery 7 to the second inverter 4 and the second stator coil 2.

Figure 2:
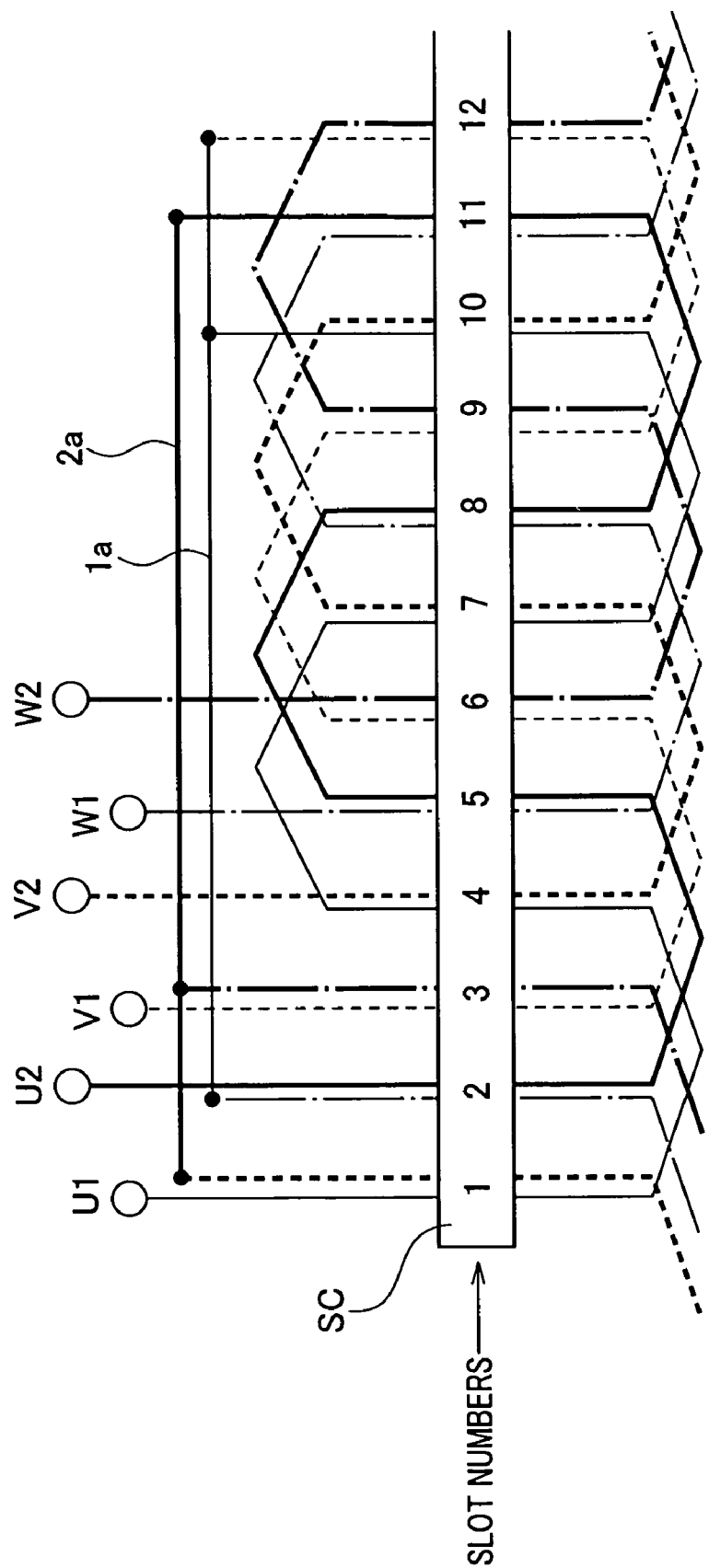
FIG. 2 is a circumferentially developed view schematically illustrating a winding structure of an arrangement of first and second stator coils illustrated in FIG. 1 according to the embodiment.

An arrangement of the first and second stator coils 1 and 2 in the common stator core SC will be described hereinafter with reference to FIG. 2. FIG. 2 schematically illustrates a winding structure of each of the first and second stator coils 1 and 2 of the four-pole, 12-slot three-phase motor M in full-pitch winding.

In FIG. 2, the first stator coil 1 is illustrated by narrow lines, and the second stator coil 2 is illustrated by wide lines. Additionally, in FIG. 2, the U-phase stator windings U1 and U2 are illustrated by solid lines, and the V-phase stator windings V1 and V2 are illustrated by dashed lines. The W-phase stator windings W1 and W2 are illustrated by long dashed short dashed lines. As described above, connection of the U-, V-, and W-phase windings U1, V1, and W1 in star configuration provides the first armature coil 1. Similarly, connection of the U-, V-, and W-phase windings U2, V2, and W2 in star configuration provides the second armature coil 2.

Each of the U-, V-, and W-phase windings U1, V1, W1, U2, V2, and W2 is wound in some of the slots of the common stator core SC in wave winding.

Specifically, in full-pitch winding for the four-pole, 12-slot three-phase motor M, one slot pitch is determined as 60 electric degrees. As described above, the U-, V-, and W-phase stator windings U1, V1, and W1 are shifted by an electric angle of, for example, 120 electric degrees ($2\pi/3$ radian) in phase from each other (see FIG. 3).

For this reason, the U-phase stator winding U1 is sequentially wound in:
the first slot (slot number 1) from one side of the stator core SC;
the fourth slot (slot number 4) from the other side of the common stator core SC;
the seventh slot (slot number 7) from the one side; and
the tenth slot (slot number 10) in the other side of the stator core SC.

Similarly, the V-phase stator winding V1 is sequentially wound in:
the third slot (slot number 3) from the one side of the stator core SC;
the sixth slot (slot number 6) from the other side of the common Stator core SC;
the ninth slot (slot number 9) from the one side; and
the twelfth slot (slot number 12) in the other side of the stator core SC.

The W-phase stator winding W1 is sequentially wound in:
the fifth slot (slot number 5) from the one side of the stator core SC;
the eighth slot (slot number 8) from the other side of the common stator core SC;
the eleventh slot (slot number 11) from the one side; and
the second slot (slot number 2) in the other side of the stator core SC.

One end of the U-phase stator winding U1 out of the tenth slot, one end of the V-phase stator winding V1 out of the twelfth slot, and that of the W-phase stator winding W1 out of the second slot are joined to each other to provide the neutral point 1a.

Figure 3:
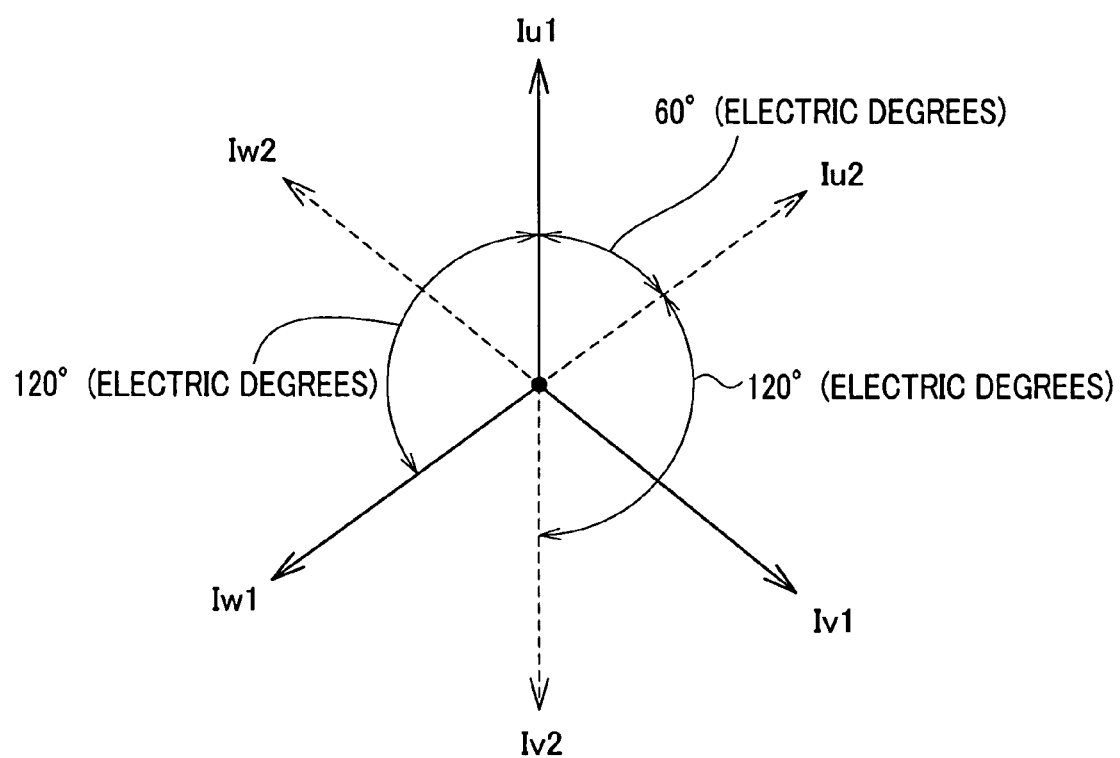
FIG. 3 is a vector diagram schematically illustrating U-, V-, and W-phase stator windings illustrated in FIG. 1 in vector mode according to the embodiment.

As described above, the U-, V-, and W-phase stator windings U2, V2, and W2 are shifted by an electric angle of, for example, 120 electric degrees ($2\pi/3$ radian) in phase from each other (see FIG. 3). In addition, the first stator coil 1 and the second stator coil 2 are arranged to be shifted by, for example, 60 electric degrees ($\pi/3$ radian) in phase from each other. For this reason, the U-, V-, and W-phase stator windings U2, V2, and W2 are so wound in some of the slots as to be shifted in phase by one slot pitch (60 electric degrees) from the U-, V-, and W-phase stator windings U1, V1, and W1, respectively (see FIG. 3).

For this reason, the U-phase stator winding U2 is sequentially wound in:
the second slot (slot number 2) from the one side of the stator core SC;
the fifth slot (slot number 5) from the other side of the common stator core SC;
the eighth slot (slot number 8) from the one side; and
the eleventh slot (slot number 11) in the other side of the stator core SC.

Similarly, the V-phase stator winding V2 is sequentially wound in:
the fourth slot (slot number 4) from the one side of the stator core SC;
the seventh slot (slot number 7) from the other side of the common stator core SC;
the tenth slot (slot number 10) from the one side; and
the first slot (slot number 1) in the other side of the stator core SC.

The W-phase stator winding W2 is sequentially wound in:
the sixth slot (slot number 6) from the one side of the stator core SC;
the ninth slot (slot number 9) from the other side of the common stator core SC;
the twelfth slot (slot number 12) from the one side; and
the third slot (slot number 3) in the other side of the stator core SC.

One end of the U-phase stator winding U2 out of the first slot, one end of the V-phase stator winding V2 out of the third slot, and that of the W-phase stator winding W2 out of the eleven slot are joined to each other to provide the neutral point 2a.

In the embodiment, the winding structure for the four-pole, 12-slot three-phase motor M has been described, but the present invention is not limited to the winding structure.

Specifically, the present invention can be applied to winding structures for motors in full-pitch winding. For example, the present invention can be applied to winding structures for 2•P-pole, 6•P-slot motors in full-pitch winding; this P is an integer greater than zero.

In addition, the present invention can be applied to winding structures for motors each having a plurality of circumferentially N-divided slots with a slot pitch of 60/N degrees in full pitch and distributed winding. In the full pitch and distributed winding, each phase winding is distributedly wound in N-slots.

The controller 9 is connected with the control terminal of each of the switching elements SW1 to SW6, with the pole position sensor 6, with the current sensors 81, with a power source (not shown).

The pole position sensor 6 works to measure a rotational pole position (angular pole position) of the rotor. The pole position sensor 6 is normally designed to use a resolver or a circuit composed of a magnet and a hall IC.

The current sensors 81 work to measure a phase current to be supplied to each of the three-phase stator windings U1, V1, and W1 of the first stator coil 1, and that to be supplied to each of the three-phase stator windings U2, V2, and W2 of the second stator coil 2. Each of the current sensors 81 is designed to use, for example, a hall IC.

The controller 9 can be designed to sensorlessly measure an angular pole position of the rotor with the use of, for example, the zero crossing of an induced voltage in one of the three-phase stator windings 11, 12, and 13 based on the zero crossing of the amount of change in a phase current to flow through the one of the three-phase stator windings. The zero crossing of an induced voltage in one of the three-phase stator windings represents an angular pole position of the rotor.

The controller 9 is integrated with a microcomputer and its peripheries including a driver for driving each switching element and relay. The controller 9 works to operate in full-wave driving mode including well-known 120-degree modulation, 180-degree modulation, or PWM sine-wave modulation to thereby individually drive on and off the switching elements SW1, SW2, SW3, SW4, SW5, and SW6 based on the measured angular pole position of the rotor.

The full-wave driving mode is to individually drive on and off the switching elements SW1, SW2, SW3, SW4, SW5, and SW6 (both of the upper-arm switching elements SW1, SW3, SW5 and the lower-arm switching elements SW2, SW4, and SW6).

For example, in the 120-degree modulation, each of the three-phase stator windings 11, 12, and 13 is energized in positive phase during rotation of the rotor by 120 electric degrees, and after rotation of the rotor by 60 electric degrees, each of the three-phase stator windings 11, 12, and 13 is energized in negative phase for rotation of the rotor by 120 electric degrees.

In the 180-degree modulation, each of the three-phase stator windings 11, 12, and 13 is energized in positive phase during rotation of the rotor by 180 electric degrees, and continuously energized in negative phase during rotation of the rotor by 180 electric degrees.

In the PWM sine-wave modulation, drive currents with pulse widths that are sinusoidally modulated are supplied to the three-phase stator windings 11, 12, and 13. This smoothly drive the three-phase motor M with little torque ripples.

Next, normal feedback PWM control operations to be executed by the controller 9 according to the embodiment will be described hereinafter.

Figure 4:
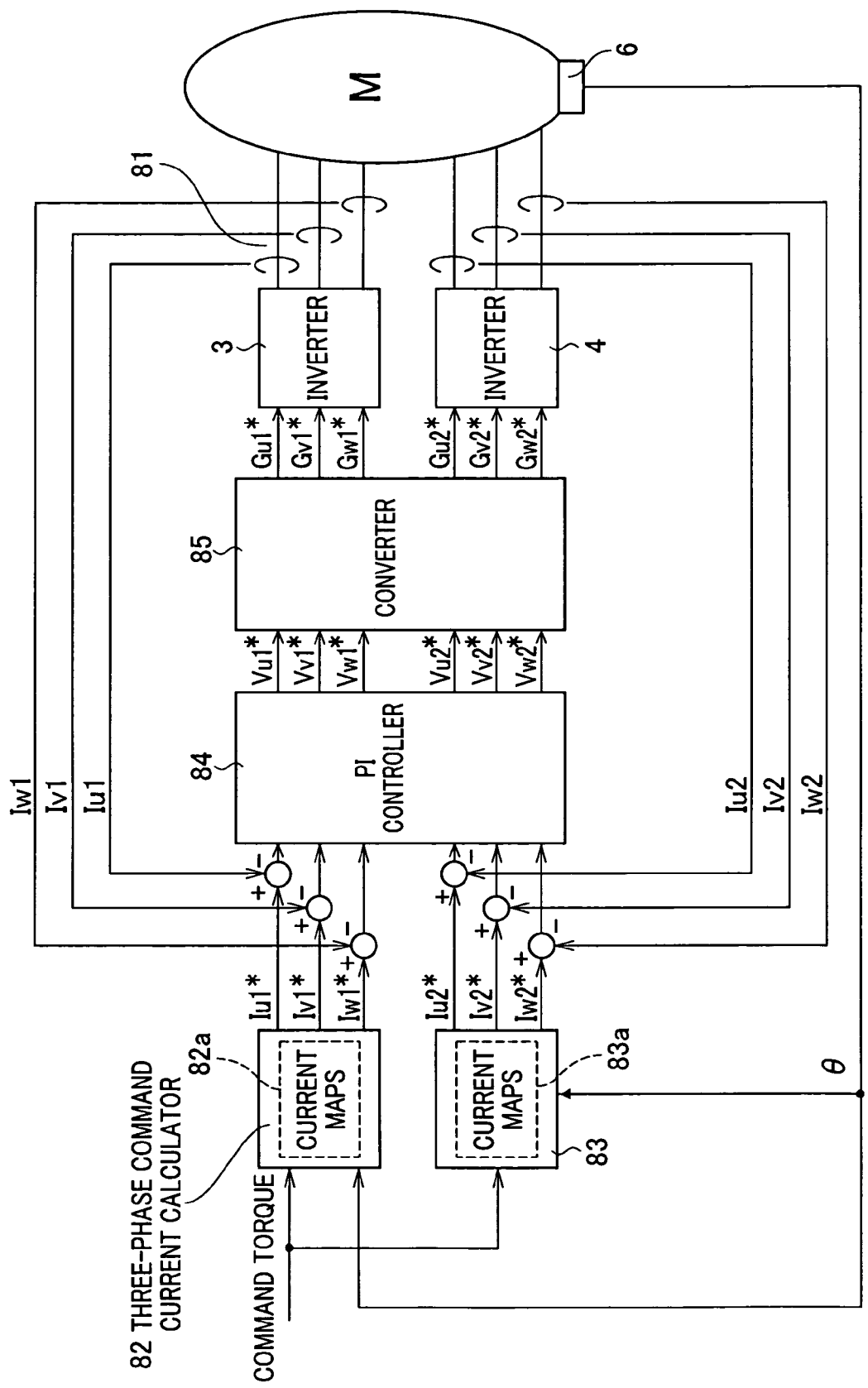
FIG. 4 is a functional diagram of a controller illustrated in FIG. 1 according to the embodiment of the embodiment of the present invention.

In the embodiment, referring to FIG. 4, the controller 9 is connected with a request torque input device (not shown) for externally inputting, to the controller 9, a commanded torque (request torque) for the rotary electric system RS by an operator.

The controller 9 includes functional modules 82, 83, Su1, Su2, Sv1, Sv2, Sw1, Sw2, 84, and 85 illustrated in FIG. 4. The functional modules 82, 83, Su1, Su2, Sv1, Sv2, Sw1, Sw2, 84, and 85 can be implemented in the controller 9 by software modules or hardware modules.

Reference character 82 represents a first three-phase command current calculator including a current map 82a. The first three-phase command current calculator 82 is operative to calculate, based on the angular pole position θ measured by the pole position sensor 6, a value of the command torque, and the current map 82a, three-phase command current values Iu1*, Iv1*, and Iw1* to be supplied to the respective three-phase stator windings U1, V1, and W1 of the first stator coil 1.

The current map 82a serves as a normal vector-control current map including data indicative of a relationship between a variable of each of three-phase command current values Iu1*, Iv1*, and Iw1* determined to be required in normal state, a variable of the command torque, and a variable of the angular pole position θ.

For example, each of three-phase command current values Iu1*, Iv1*, and Iw1* sinusoidally varies as the angular position θ is changed.

The first three-phase command current calculator 82 works to select, in the map 82a, a value of the three-phase command current values Iu1*, Iv1*, and Iw1* corresponding to the angular pole position θ measured by the pole position sensor 6 and the value of the command torque. Thus, the first three-phase command current calculator 82 works to output the selected value of the three-phase command current values Iu1*, Iv1*, and Iw1*.

Similarly, reference character 83 represents a second three-phase command current calculator including a current map 83a. The second three-phase command current calculator 83 is operative to calculate, based on the angular pole position θ measured by the pole position sensor 6, a value of the command torque, and the current map 83a, three-phase command current values Iu2*, Iv2*, and Iw2* to be supplied to the respective three-phase stator windings U2, V2, and W2 of the second stator coil 2.

The current map 83a serves as a normal vector-control current map including data indicative of a relationship between a variable of each of three-phase command current values Iu2*, Iv2*, and Iw2* determined to be required in normal state, a variable of the command torque, and a variable of the angular pole position θ.

For example, each of three-phase command current values Iu2*, Iv2*, and Iw2* sinusoidally varies as the angular pole position θ is changed.

The second three-phase command current calculator 83 works to select, in the map 83a, a value of the three-phase command current values Iu2*, Iv2*, and Iw2* corresponding to the angular pole position θ measured by the pole position sensor 6 and the value of the command torque. Thus, the second three-phase command current calculator 83 works to output the selected value of the three-phase command current values Iu2*, Iv2*, and Iw2*.

Reference characters Su1, Sv1, Sw1, Su2, Sv2, and Sw2 represent subtractors. The subtracter Su1 works to calculate the difference between the U-phase command current value Iu1* and a U-phase current value Iu1 in the U-phase stator winding U1 and actually measured by the corresponding current sensor 81.

Similarly, the subtracter Sv1 works to calculate the difference between the V-phase command current value Iv1* and a V-phase current value Iv1 in the V-phase stator winding V1 actually measured by the corresponding current sensor 81, and the subtractor Sw1 works to calculate the difference between the W-phase command current value Iw1* and a W-phase current value Iw1 in the W-phase stator winding W1 actually measured by the corresponding current sensor 81.

The subtractor Su2 works to calculate the difference between the U-phase command current value Iu2* and a U-phase current value Iu2 in the U-phase stator winding U2 and actually measured by the corresponding current sensor 81.

Similarly, the subtractor Sv2 works to calculate the difference between the V-phase command current value Iv2* and a V-phase current value Iv2 in the V-phase stator winding V2 actually measured by the corresponding current sensor 81, and the subtractor Sw2 works to calculate the difference between the W-phase command current value Iw2* and a W-phase current value Iw2 in the W-phase stator winding W2 actually measured by the corresponding current sensor 81.

Reference character 84 represents a PI (Proportional Integral) controller. The PI controller 84 works to calculate three-phase voltage command values Vu1*, Vv1*, and Vw1* based on the calculated U-, V-, and W-phase current differences by the subtracters Su1, Sv1, and Sw1 in accordance with a PI feedback control algorithm (PI algorithm). Specifically, the PI controller 84 works to calculate each of U-, V-, and W-phase voltage command values Vu1*, Vv1*, and Vw1* that allows the calculated U-, V-, and W-phase current differences to become zero.

Similarly, the PI controller 84 works to calculate three-phase voltage command values Vu2*, Vv2*, and Vw2* based on the calculated U-, V-, and W-phase current differences by the subtracters Su2, Sv2, and Sw2 in accordance with the PI feedback control algorithm. Specifically, the PI controller 84 works to calculate each of U-, V-, and W-phase voltage command values Vu2*, Vv2*, and Vw2* that allows the calculated U-, V-, and W-phase current differences to become zero.

Reference character 85 represents a converter.

The converter 85 works to convert the calculated three-phase voltage command values Vu1*, Vv1*, and Vw1* into three-phase pulse signals Gu1*, Gv1*, and Gw1* with duty cycles for respective three-phase switching elements of the first inverter 3 by comparing the calculated three-phase voltage command values Vu1*, Vv1*, and Vw1* with a PWM carrier signal (for example, a triangular carrier wave). In other words, the converter 85 works to generate the three-phase pulse signals Gu1*, Gv1*, and Gw1* each with a sinusoidally modulated pulse width with a corresponding one of the converted duty cycles for the respective three-phase switching elements of the second inverter 4.

Similarly, the converter 85 works to convert the calculated three-phase voltage command values Vu2*, Vv2*, and Vw2* into three-phase pulse signals Gu2*, Gv2*, and Gw2* with duty cycles for respective three-phase switching elements of the second inverter 4 by comparing the calculated three-phase voltage command values Vu2*, Vv2*, and Vw2* a PWM carrier signal (for example, a triangular carrier wave). In other words, the converter 85 works to generate the three-phase pulse signals Gu2*, Gv2*, and Gw2* each with a sinusoidally modulated pulse width with a corresponding one of the converted duty cycles for the respective three-phase switching elements of the second inverter 4.

Thereafter, the converter 85 also works to apply the three-phase pulse signals Gu1*, Gv1*, and Gw1* to the respective three-phase switching elements of the first inverter 3.

Similarly, the converter 85 works to apply the three-phase pulse signals Gu2*, Gv2*, and Gw2* to the respective three-phase switching elements of the second inverter 4.

For example, the converter 85 applies the U-phase pulse signal Gu1* to each of the switching elements SW1a and SW2a, the V-phase pulse signal Gv1* to each of the switching elements SW3a and SW4a, and the W-phase pulse signal Gw1* to each of the switching elements SW5a and SW6a. The converter 85 also applies the U-phase pulse signal Gu2* to each of the switching elements SW1b and SW2b, the V-phase pulse signal Gv2* to each of the switching elements SW3b and SW4b, and the W-phase pulse signal Gw2* to each of the switching elements SW5b and SW6b.

Next, operations of each of the first and second inverters 3 and 4 under control of the controller 9 will be described hereinafter with reference to FIG. 1.

As described above, the neutral point 1a of the first stator coil 1 is connected with the high-side electrode of the battery 7.

Thus, when one low-side switching element of the first inverter 3 corresponding to one phase stator winding of the first stator coil 1 is in on state while the corresponding high-side switching element thereof is in off state, an output DC voltage of the battery 7 causes a substantially direct current Idc1 to flow through the one phase stator winding. This charges electromagnetic energy in the common stator core SC in which the one phase stator winding of the first stator coil 1 is wound.

When the one low-side switching element of the first inverter 3 is turned off, the sum of the charged electromagnetic energy and the battery voltage charges the capacitor 5 via the corresponding high-side switching element of the first inverter 3 or the flywheel diode connected in antiparallel with the corresponding high-side switching element. This circuit structure is equivalent to a normal boost chopper. A boost ratio representing a ratio between a DC voltage to be charged in the capacitor 5 and that to be outputted from the battery 7 is designed to be adjusted by a duty cycle for the one low-side switching element of the first inverter 3.

The capacitor 5 serves as a DC power source higher in voltage than the battery 7 viewed from the first inverter 3. Thus, the first inverter 3 is controlled by the controller 9 in the normal PWM feedback mode set forth above based on the voltage charged in the capacitor 5 to thereby supply three-phase alternating currents to the three-phase stator windings of the first stator coil 1, respectively.

Preferably, the low-side switching elements of the first inverter 3 be configured to be turned on and off in synchronization with each other upon the capacitor 5 being charged.

Specifically, the controller 9 is programmed to carry out feedback control to:

compare a voltage charged in the capacitor 5 with a preset target voltage to calculate the difference therebetween; and increase or decrease a duty cycle for each of the low-side switching elements of the first inverter 3 based on the calculated difference to thereby maintain the voltage charged in the capacitor 5 at the target voltage.

The controller 9 allows individual adjustment of the duty cycle for each of the switching elements of the first inverter 3 to thereby individually supply an alternating current to each stator winding of the first stator coil 1 per phase. Specifically, turning on of one low-side switching element of the first inverter 3 for one phase stator winding of the first stator coil 1 means the intermittent supply of a phase current to the one phase stator winding in one direction. Turning off of the one low-side switching element of the first inverter 3 allows electromagnetic energy charged in the one phase stator winding to charge the capacitor 5 via the corresponding high-side switching element or the corresponding flywheel diode.

In addition, turning on of one high-side switching element of the first inverter 3 for one phase stator winding of the first stator coil 1 means the intermittent supply of a phase current to the one phase stator winding in the other direction from the capacitor 5 serving as a DC power source.

As described above, in the embodiment, the first inverter 3 and the stator coil 1 serving as a reactor provide a boost chopper that charges a voltage in the capacitor 5 so as to boost it to be higher than the battery voltage during predetermined periods. During other periods, the first inverter 3 works to supply three-phase alternating currents to the respective three-phase stator windings of the first stator coil 1 based on the DC voltage charged in the capacitor 5 serving as the DC power source.

The charging operations for the capacitor 5 by the second inverter 4 and the three-phase AC current supplying operations thereby are substantially identical to those by the first inverter 3 as described above, and therefore descriptions of them can be omitted.

As a result, a direct current Idc1 is supplied from the battery 7 to the first inverter 3, and a direct current Idc2 is supplied from the battery 7 to the second inverter 4.

In the embodiment, as described above, the three-phase stator windings U1, V1, and W1 of the first stator coil 1 and the three-phase stator windings U2, V2, and W2 of the second stator coil 2 are arranged to be shifted by 60 electric degrees ($\pi/3$ radian) in phase from each other to form a six-phase stator coil. Six-phase currents flowing through respective six-phase stator windings of the six-phase stator coil are shifted by 60 electric degrees in phase from each other (see FIG. 4).

Figure 5:
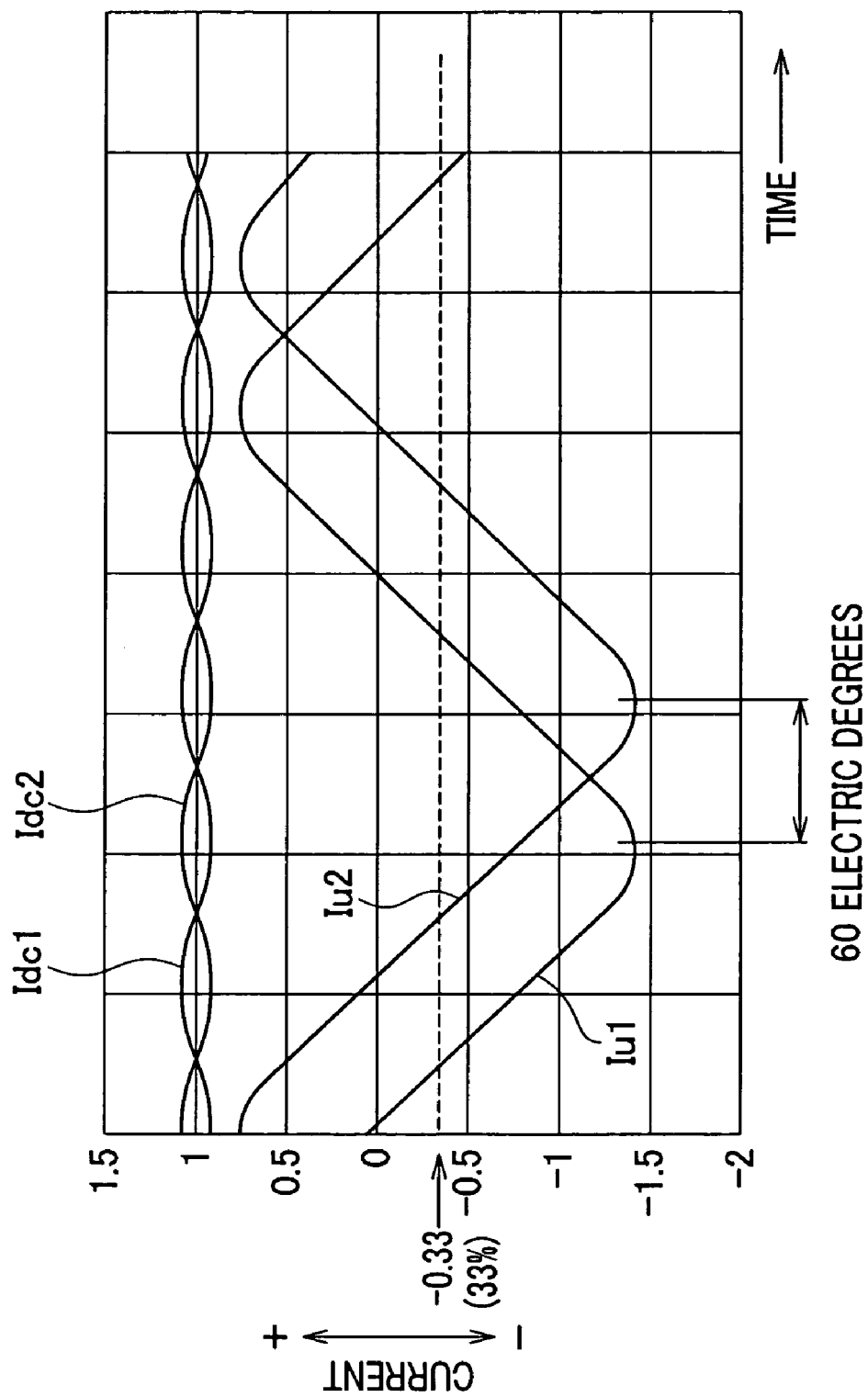
FIG. 5 is a graph schematically illustrating waveforms of fundamental wave components of U-phase stator currents of respective first and second stator coils illustrated in FIG. 1 and waveforms of direct currents supplied from a power supply source in which third harmonic wave components are contained according to the embodiment.

FIG. 5 schematically illustrates waveforms of:

a fundamental wave component of a substantially sinusoidal phase current Iu1 to be supplied to the U-phase stator winding U1 of the first stator coil 1;

a fundamental wave component of a substantially sinusoidal phase current Iu2 to be supplied to the U-phase stator winding U2 of the second stator coil 2 shifted by 60 electric degrees from the phase current Iu1 in phase;

the direct current Idc1 to be supplied to the first inverter 3 from the battery 7; and the direct current Idc2 to be supplied to the second inverter 4 from the battery 7.

An amount of power to be transferred from each of the three-phase stator windings U1, V1, and W1 to the capacitor 5 is equal to each other. For this reason, an amount of the phase current Iu1 flowing through the U-phase stator winding U1 is one third of that of the direct current Idc1 on average. Similarly, an amount of power to be transferred from each of the three-phase stator windings U2, V2, and W2 to the capacitor 5 is equal to each other. For this reason, an amount of the phase current Iu2 flowing through the U-phase stator winding U2 is one third of that of the direct current Idc2 on average.

Thus, as illustrated in FIG. 5, the phase current Iu1 has a substantially sinusoidal waveform in which its zero level is negatively offset by Idc1/3 (33% of Idc1) in a direction opposite to the direction of the direct current Idc1, and similarly the phase current Iu2 has a substantially sinusoidal waveform in which its zero level (an average level of its amplitude) is offset by Idc2/3 (33% of Idc2) in a direction opposite to the direction of the direct current Idc2 (see FIG. 5).

As clearly illustrated in FIG. 5, third harmonic wave components are superimposed on the direct current Idc1. The third harmonic wave components is the sum of third harmonic wave components superimposed on the respective phase currents Iu1, Iv1, and Iw1.

Similarly, third harmonic wave components are superimposed on the direct current Idc2. The third harmonic wave components are synthesis of third harmonic wave components superimposed on the respective phase currents Iu2, Iv2, and Iw2.

The third harmonic wave components to be superimposed on each of the stator windings Iu1, Iv1, Iw1, Iu2, Iv2, and Iw2 can be generated due to various factors including the form of each teeth of the stator core SC.

In order to address the third harmonic wave components, in the embodiment, the U-, V-, and W-phase stator windings U1, V1, and W1 of the first stator core 1 are arranged to be shifted by 60 electric degrees in phase from the U-, V-, and W-phase stator windings U2, V2, and W2, respectively. For this reason, the third harmonic wave components superimposed on the direct current Idc1 are reversed in phase from those superimposed on the direct current Idc2.

The reason why the third harmonic wave components superimposed on the direct current Idc1 are reversed in phase from those superimposed on the direct current Idc2 will be further described hereinafter.

The third harmonic wave components superimposed on the phase current Iu1 should be shifted by 60 electric degrees in phase from those superimposed on the phase current Iu2 assuming that one cycle of each of the phase currents Iu1 and Iu2 is considered to be 360 electric degrees.

However, because a frequency of the third harmonic wave components is three-times that of the phase current Iu2, the third harmonic wave components superimposed on the phase current Iu1 is shifted by 180 electric degrees in phase from those superimposed on the phase current Iu2 assuming that one cycle of the third harmonic wave components is considered to be 360 electric degrees. In other words, the third harmonic wave components superimposed on the phase current Iu1 is reversed in phase from those superimposed on the phase current Iu2.

Specifically, the winding arrangement of the first and second stator coils 1 and 2 with the phase difference of 60 electric degrees therebetween results in that:

the third harmonic wave components superimposed on the direct current Idc1 to be supplied to the neutral point 1a of the first stator coil 1 from the battery 7 and the third harmonic wave components superimposed on the direct current Idc2 to be supplied to the neutral point 2a of the second stator coil 2 from the battery 7 are canceled out each other.

This significantly reduces the third harmonic wave components to be supplied from the battery 7 to the first and second stator coils 1 and 2.

Like the third harmonic wave components, part of n-th harmonic wave components except for the third harmonic wave components superimposed on the direct current Idc1 to be supplied to the neutral point 1a of the first stator coil 1 from the battery 7 and part of n-th harmonic wave components except for the third harmonic wave components superimposed on the direct current Idc2 to be supplied to the neutral point 2a of the second stator coil 2 from the battery 7 are canceled out each other.

As described above, the rotary electric system RS according to the embodiment is configured to reduce the flow of higher harmonic wave components in the cable 71 from the battery 7 to the connecting point 72 and in the cable 77 from the low-side DC terminal 75 to the low-side electrode of the battery 7. This simplifies electromagnetic-emission measures for the cables 71 and 77, and has influence on the lifetime of the battery 7.

The rotary electric system RS according to the embodiment is also configured such that:

the high-side electrode of the battery 7 is commonly connected with the neutral point 1a of the first stator coil 1 and with the neutral point 1b of the second stator coil 2; and the low-side electrode of the battery 7 is connected with the common low-side DC terminal 75 of the first and second inverters 3 and 4.

This configuration allows the common low-side DC terminal 75 of the first and second inverters 3 and 4 to be constant in potential, thus achieving commonality in potential between a low-side DC terminal of the first inverter 3 and that of the second inverter 4.

Particularly, in the embodiment, the common low-side DC terminal 75 of the first and second inverters 3 and 4 is connected with the low-side electrode of the battery 7. This allows the common low-side DC terminal 75 of the first and second inverters 3 and 4 to be set to a ground potential.

This therefore makes possible that the common low-side DC terminal 75 of the first and second inverters 3 and 4 serves as vehicle body ground (body earth), thus reducing in size the circuit structure of the rotary electric system RS.

Next, a first modification of the embodiment will be described hereinafter.

Figure 6:
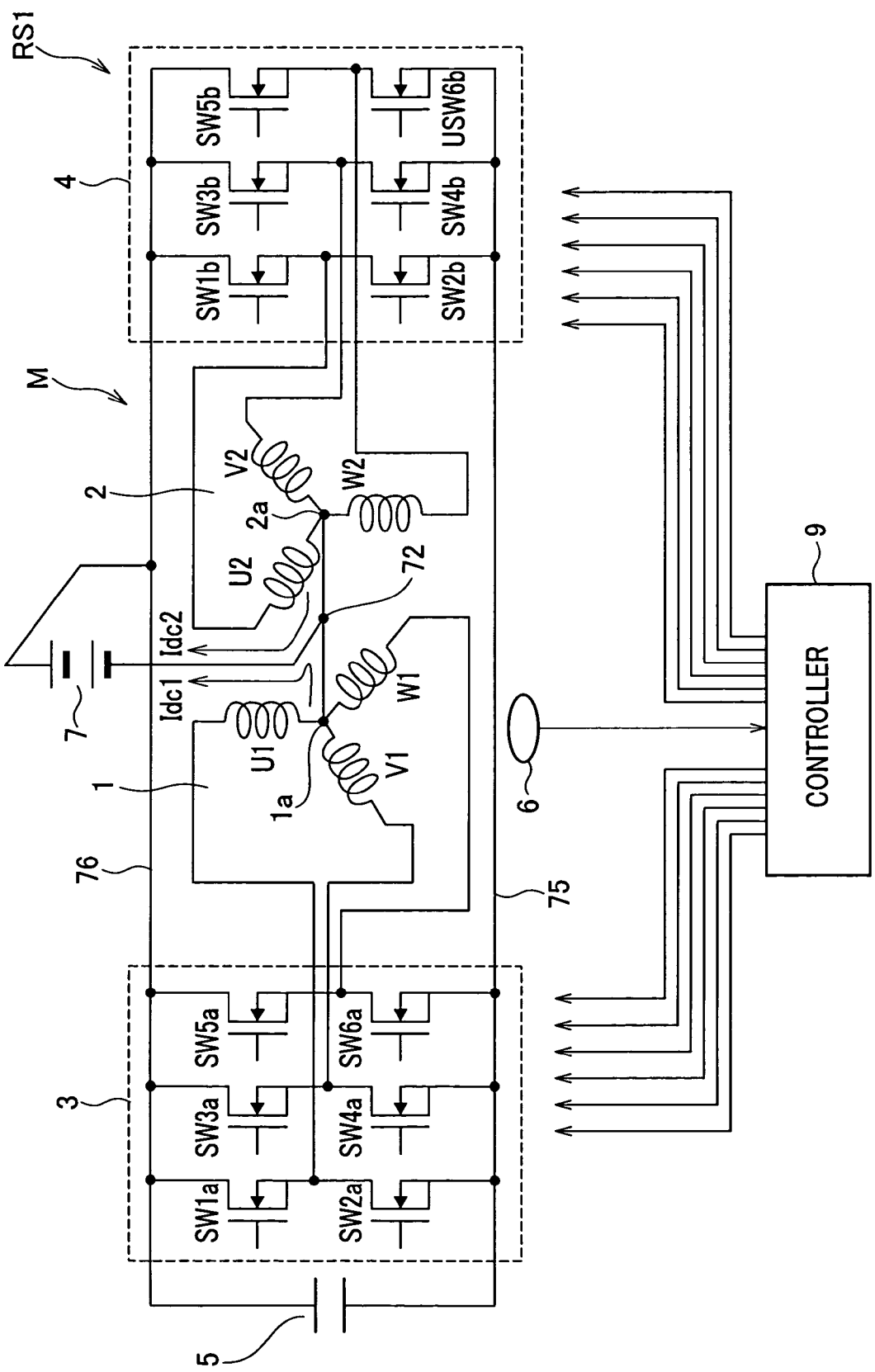
FIG. 6 is a circuit diagram schematically illustrating an example of the structure of a rotary electric system according to a first modification of the embodiment of the present invention.

Referring to FIG. 6, the structure of a rotary electric system RS1 according to the first modification is substantially identical to that of the rotary electric system RS according to the embodiment except for the connection between the battery 7 and the connecting point 72 and between the battery 7 and each of the first and second inverters 3 and 4. So, like parts between the rotary electric systems RS and RS1 according to the embodiment and the first modification, to which like reference characters are assigned, are omitted or simplified in description.

In the rotary electric system RS1, the low-side electrode of the battery 7 is connected with the connecting point 72, and the high-side electrode of the battery 7 is connected with the common high-side DC terminal 76 of the first and second inverters 3 and 4.

With the configuration of the rotary electric system RS1, when one high-side switching element of the first inverter 3 corresponding to one phase stator winding of the first stator coil 1 is in on state while the corresponding low-side switching element thereof is in off state, an output DC voltage of the battery 7 causes a substantially direct current Idc1 to flow through the one phase stator winding toward the neutral point 1a (low-side electrode of the battery 7).

This charges electromagnetic energy in the common stator core SC in which the one phase stator winding of the first stator coil 1 is wound.

When the one high-side switching element of the first inverter 3 is turned off, the sum of the charged electromagnetic energy and the battery voltage charges the capacitor 5 via the corresponding low-side switching element of the first inverter 3. Other operations of the first inverter 3 of the rotary electric system RS1 are substantially identical to those of the first inverter 3 of the rotary electric system RS, and therefore, they are omitted in description.

Figure 7:
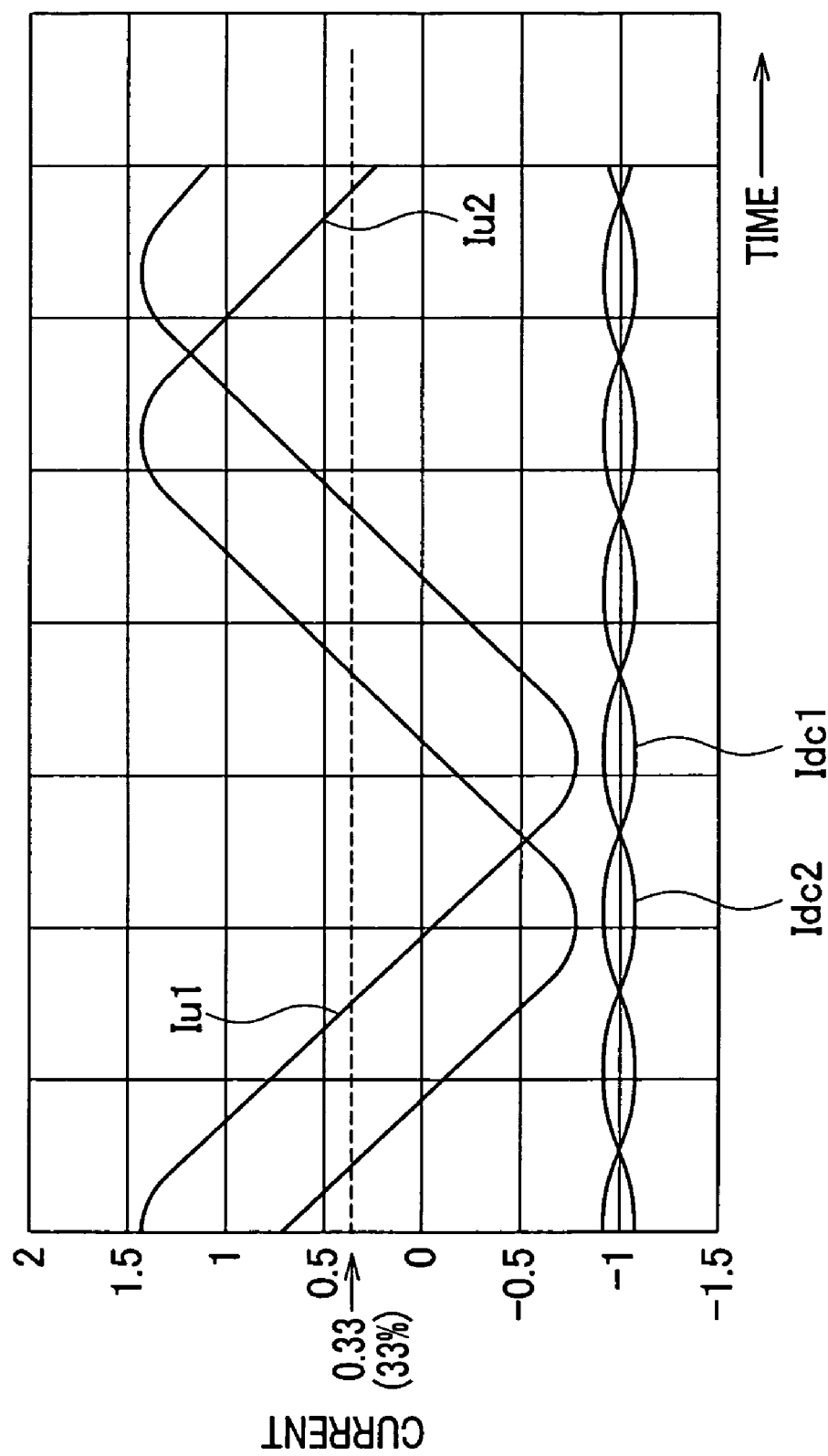
FIG. 7 is a graph schematically illustrating waveforms of fundamental wave components of U-phase stator direct of respective first and second stator coils illustrated in FIG. 6 and waveforms of direct currents supplied from a power supply source in which third harmonic wave components are contained according to the first modification of the embodiment.

In the first modification, the direct current Idc1 flows from the neutral point 1a to the low-side electrode of the battery 7 as a return current so that:

the phase current Iu1 has a substantially sinusoidal waveform in which its zero level is positively offset by Idc1/3 (33% of Idc1) in a direction opposite to the direction of the direct current Idc1. Similarly, a phase current Iu2 has a substantially sinusoidal waveform in which its zero level (an average level of its amplitude) is positively offset by Idc2/3 (33% of Idc2) in a direction opposite to the direction of the direct current Idc2 (see FIG. 7).

Specifically, the configuration of the rotary electric machine RS1 boots a voltage charged in the capacitor 5 to be higher than a voltage applied from the battery 7.

Next, a second modification of the embodiment will be described hereinafter.

Referring to FIG. 8, the structure of a rotary electric system RS2 according to the second modification is substantially identical to that of the rotary electric system RS according to the embodiment except for the connection between the battery 7 and the connecting point 72 and between the battery 7 and each of the first and second inverters 3 and 4. So, like parts between the rotary electric systems RS and RS2 according to the embodiment and the second modification, to which like reference characters are assigned, are omitted or simplified in description.

The rotary electric system RS2 includes a pair of first and second batteries 7a and 7b in place of the battery 7. A low-side electrode of the first battery 7a is connected with the connecting point 72, and the high-side electrode of the first battery 7a is connected with the common high-side DC terminal 76 of the first and second inverters 3 and 4.

In addition, a high-side electrode of the second battery 7b is connected with the connecting point 72, and the low-side electrode of the second battery 7b is connected with the common low-side DC terminal 75 of the first and second inverters 3 and 4.

For example, a single battery with a center tap can be used as the pair of first and second batteries 7a and 7b. In this case, the center tap is connected with the connecting point 72.

Operations of the rotary electric system RS2 are substantially identical to those of the combination of the rotary electric system RS and the rotary electric system RS1, and therefore, they are omitted.

The offset of each of three-phase currents to be outputted from the first and second inverters 3 and 4 can be implemented by operations of the first and second three-phase command current calculators 82 and 83.

Specifically, the first three-phase command current calculator 82 works to calculate a direct current Idc1 flowing through the neutral point 1a in a reactor mode in which each of the low-side switching elements is in on state, and to calculate an offset value based on the calculated direct current Idc1. In the embodiment, as described above, the offset value is a negative value of 0.33 Idc1, and in the first modification, the offset value is a positive value of 0.33 Idc1, The first three-phase command current calculator 82 works to calculate, based on the angular pole position $\theta$ measured by the pole position sensor 6, a value of the command torque, and the current map 82a, three-phase command current values Iu1*, Iv1*, and Iw1* to be supplied to the respective three-phase stator windings U1, V1, and W1 of the first stator coil 1. Each of the three-phase command current values Iu1*, Iv1*, and Iw1* sinusoidally varies as the angular position $\theta$ of the rotor is changed.

Thereafter, the first three-phase command current calculator 82 works to add the calculated offset value to each of the three-phase command current values Iu1*, Iv1*, and Iw1*, and to output the three-phase command current values Iu1*, Iv1*, and Iw1* to each of which the offset value is commonly added.

Similarly, the second three-phase command current calculator 83 can carry out the same operations as those of the first three-phase command current calculator 82.

In each of the embodiment and its first and second modifications, the controller 9 can set:

a frequency of the PWM carrier signals for intermittently switching on the respective switching elements of the first inverter 3 to be equal to that of the PWM carrier signals for intermittently switching on the respective switching elements of the second inverter 4; and a phase of the PWM carrier signals for intermittently switching on the respective switching elements of the first inverter 3 to be reversed from that of the PWM carrier signals for intermittently switching on the respective switching elements of the second inverter 4.

This doubles switching noise frequencies due to the PWM carrier signals as compared with the frequency of the PWM carrier signals to thereby reduce switching loss, such as halve it. This results in facilitating the thermal design for each of the first and second inverters 3 and 4.

The rotary electric systems RS, RS1, and RS2 can be preferably applied to electric power steering systems for motor vehicles as their drive systems for increasing steering force to be applied to turning of a steering. This can omit a DC to DC converter as a specific booster from each of the drive systems, and reduce variations in the battery voltage thereof. Thus, it is possible to achieve high-power electric power steering systems each with a compact size.

The rotary electric systems RS, RS1, and RS2 can be preferably applied to air-conditioners for motor vehicles as their drive systems for driving compressors of the air-conditioners. This can omit a DC to DC converter as a specific booster from each of the drive systems, and reduce variations in the battery voltage thereof. Thus, it is possible to achieve high-power air-conditioners each with a compact size.

While there has been described what is at present considered to be the embodiment and its modifications of the present invention, it will be understood that various modifications which are not described yet may be made therein, and it is intended to cover in the appended claims all such modifications as fall within the true spirit and scope of the invention.

What is claimed is:

1. A rotary electric system comprising:
   a rotary electric machine provided with a rotor, a common stator core, and a pair of first and second star-connected multiphase stator windings each with a neutral point, the neutral point of the first star-connected multiphase stator windings and the neutral point of the second star-connected multiphase stator windings having a same potential, the first and second star-connected multiphase stator windings being wound in the common stator core with a predetermined first phase difference therebetween, the rotary electric machine configured to rotate the rotor when at least one of the first and second star-connected multiphase stator windings is energized;
   a pair of first and second multiphase inverters each having a high-side terminal and a common low-side terminal, the first multiphase inverter including a high-side switching element and a low-side switching element per phase of the first multiphase stator windings, the second multiphase inverter including a high-side switching element and a low-side switching element per phase of the second multiphase stator windings;
   a capacitor connected between the high-side terminal and the low-side terminal of each of the first and second multiphase inverters;
   a direct current power source connected between at least one of the high-side terminal and the low-side terminal of each of the first and second multiphase inverters and the neutral points of the first and second multiphase stator windings; and
   a controller connected with the high-side and low-side switching elements per phase of each of the first and second multiphase stator windings and configured to turn the high-side and low-side switching elements on and off to thereby cause:
   the first multiphase inverter to intermittently supply a first phase current to the first star-connected multiphase stator windings per phase to charge first electromagnetic energy in the first star-connected multiphase stator windings per phase, the first electromagnetic energy charging the capacitor;
   the second multiphase inverter to intermittently supply a second phase current to the second star-connected multiphase stator windings per phase to charge second electromagnetic energy in the second star-connected multiphase stator windings per phase, the second electromagnetic energy charging the capacitor, the first phase current for each phase and the second phase current for a corresponding one phase having a predetermined second phase difference from each other, the first phase difference being matched with the second phase difference.

2. A rotary electric system according to claim 1, further comprising:
   a common conductive member having one and an other one end, the one end being connected with the direct current power source;
   a first branch conductive member connecting between the neutral point of the first star-connected multiphase stator windings and the other one end of the common conductive member; and
   a second branch conductive member connecting between the neutral point of the second star-connected multiphase stator windings and the other one end of the common conductive member.

3. A rotary electric system according to claim 1, wherein the first phase difference is 60 electric degrees of rotation of the rotor.

4. A rotary electric system according to claim 1, wherein the direct current power source has a high-side electrode and a low-side electrode, the high-side electrode of the direct current power source being connected with the neutral points of the first and second star-connected multiphase stator windings, the low-side electrode of the direct current power source being connected with the low-side terminal of each of the first and second multiphase inverters,
   the first multiphase inverter is configured to supply an alternating current to each phase winding of the first star-connected multiphase stator windings based on a command current value for each phase winding thereof, the command current value varying in the form of a negatively offset sinusoidal wave as a position of the rotor is changed, and
   the second multiphase inverter is configured to supply an alternating current to each phase winding of the second star-connected multiphase stator windings based on a command current value for each phase winding thereof, the command current value varying in the form of a negatively offset sinusoidal wave as a position of the rotor is changed.

5. A rotary electric system according to claim 1, wherein the direct current power source has a high-side electrode and a low-side electrode, the high-side electrode of the direct current power source being connected with the high-side terminal of each the first and second multiphase inverters, the low-side electrode of the direct current power source being connected with the neutral points of the first and second star-connected multiphase stator windings, the first multiphase inverter is configured to supply an alternating current to each phase winding of the first star-connected multiphase stator windings based on a command current value for each phase winding thereof, the command current value varying in the form of a positively offset sinusoidal wave as a position of the rotor is changed, and the second multiphase inverter is configured to supply an alternating current to each phase winding of the second star-connected multiphase stator windings based on a command current value for each phase winding thereof, the command current value varying in the form of a positively offset sinusoidal wave as a position of the rotor is changed.

6. A rotary electric machine according to claim 1, wherein the controller is configured to:

generate, based on a first PWM carrier signal, a first pulse signal with an adjustably modulated duty cycle;

supply the generated first pulse signal to each of the high-side and low-side switching elements per phase of the first multiphase inverter to thereby individually turn each of the high-side and low-side switching elements per phase of the first multiphase inverter on and off;

generate, based on a second PWM carrier signal, a second pulse signal with an adjustably modulated duty cycle; and supply the generated second pulse signal to each of the high-side and low-side switching elements per phase of the second multiphase inverter to thereby individually turn each of the high-side and low-side switching elements per phase of the second multiphase inverter on and off, the first PWM carrier signal being matched in frequency with the second PWM carrier signal and reversed in phase from the second PWM carrier signal.

7. A rotary electric system according to claim 1, wherein the rotary electric machine is installed in a power steering system as a drive motor for increasing steering force to be applied to a steering.

8. A rotary electric system according to claim 1, wherein the rotary electric machine is installed in an air-conditioner for a motor vehicle as a drive motor for driving a compressor of the air-conditioner.

* * * * *